(12) United States Patent
Yang et al.

(10) Patent No.: US 12,348,017 B2
(45) Date of Patent: Jul. 1, 2025

(54) JUNCTION BOX AND METHOD FOR MOUNTING JUNCTION BOX

(71) Applicant: Jiangxi Jinko PV Material Co., Ltd., Shangrao Eco. & Tech. Dev. Zone (CN)

(72) Inventors: Long Yang, Shangrao (CN); Dequan Zhou, Shangrao (CN)

(73) Assignee: JIANGXI JINKO PV MATERIAL CO., LTD., Shangrao (CN)

( * ) Notice: Subject to any disclaimer, the term of this patent is extended or adjusted under 35 U.S.C. 154(b) by 244 days.

(21) Appl. No.: 18/129,627

(22) Filed: Mar. 31, 2023

(65) Prior Publication Data
US 2024/0154396 A1    May 9, 2024

(30) Foreign Application Priority Data
Nov. 3, 2022   (CN) .......................... 202211370388.5

(51) Int. Cl.
*H02G 3/08* (2006.01)
*H02G 3/18* (2006.01)

(52) U.S. Cl.
CPC ............... *H02G 3/081* (2013.01); *H02G 3/18* (2013.01)

(58) Field of Classification Search
CPC ............ H02G 3/08; H02G 3/081; H02G 3/18; H02G 3/16; H02G 3/086; H02G 3/14; H05K 5/00; H05K 5/02; H05K 5/0217; H05K 5/0247; H05K 5/04; H05K 7/00; H05K 7/14; H01R 13/00; H01R 13/46; H01R 13/53; H01R 13/533; H02S 40/34

USPC ..... 174/50, 520, 559, 59; 220/3.2, 3.3, 4.02; 248/906; 361/600, 601, 641, 679.01; 439/76.1, 76.2
See application file for complete search history.

(56) References Cited

U.S. PATENT DOCUMENTS

| | | | | |
|---|---|---|---|---|
| 8,895,852 | B2* | 11/2014 | Sella ....................... | H02G 3/081 174/59 |
| 8,907,230 | B2* | 12/2014 | Chen .................. | H01R 13/5216 174/521 |
| 8,963,000 | B2* | 2/2015 | Xiao ........................ | H02G 3/16 174/520 |
| 11,777,444 | B2* | 10/2023 | Pomerantz ............ | H02S 40/345 174/50 |
| 11,973,462 | B1* | 4/2024 | Chen .................... | H01R 9/2425 |
| 2011/0244719 | A1 | 10/2011 | Xue | |
| 2012/0048614 | A1 | 3/2012 | Xue | |

(Continued)

OTHER PUBLICATIONS

European Search Report from corresponding European Application No. 23166299, mailed on Aug. 24, 2023; 8 pages.

*Primary Examiner* — Angel R Estrada
(74) *Attorney, Agent, or Firm* — Tucker Ellis LLP

(57) ABSTRACT

A junction box and a method for mounting a junction box. The junction box includes a housing and an assembly module. The housing is hollow inside to form an accommodation space. The accommodation space passes through two sides of the housing along a thickness direction of the junction box. The assembly module includes a bottom plate and an electronic element. Along the thickness direction of the junction box, the bottom plate is mounted on one side of the housing, the bottom plate and the housing define an accommodation cavity, the electronic element is mounted on the bottom plate, and at least part of the electronic element is located in the accommodation cavity. The housing and the bottom plate are separately arranged and connected to each other.

19 Claims, 8 Drawing Sheets

(56) References Cited

U.S. PATENT DOCUMENTS

2013/0012060 A1    1/2013   Xiao
2013/0050956 A1    2/2013   Wang

* cited by examiner

JUNCTION BOX AND METHOD FOR MOUNTING JUNCTION BOX

CROSS-REFERENCE TO RELATED APPLICATIONS

The present application claims priority to Chinese Patent Application No. 202211370388.5, filed on Nov. 3, 2022, the content of which is incorporated herein by reference in its entirety.

TECHNICAL FIELD

The present disclosure relates to the technical field of photovoltaic modules, and in particular, to a junction box and a method for mounting a junction box.

BACKGROUND

A photovoltaic cell is used to convert solar energy into electrical energy and transfer the electrical energy to the battery for storage or to drive load for operation. The photovoltaic cell is connected with a junction box configured to connect output of the photovoltaic cell to the cable. The junction box includes a housing, a bottom plate, and an electronic element mounted on the bottom plate. The electronic element may be a circuit board, a diode, an intelligent monitoring element, or the like, to guarantee normal operation of the solar photovoltaic module and the junction box.

In general cases, the housing and the bottom plate form an integrated structure. When electronic elements of different types and dimensions are mounted on the bottom plate, mounting structures on the bottom plate are different accordingly. Therefore, when the electronic element in the junction box is replaced, there is a need to replace the housing and the bottom plate as a whole, which increases manufacturing costs of the junction box.

SUMMARY

The present disclosure provides a junction box and a method for mounting a junction box, which can reduce manufacturing costs of the junction box.

In a first aspect of the present disclosure, a junction box is provided, including a housing hollow inside to form an accommodation space, wherein the accommodation space passes through two sides of the housing along a thickness direction of the junction box; and an assembly module including a bottom plate and an electronic element, wherein along the thickness direction of the junction box, the bottom plate is mounted on one side of the housing, the bottom plate and the housing define an accommodation cavity, the electronic element is mounted on the bottom plate, and at least part of the electronic element is located in the accommodation cavity. The housing and the bottom plate are separately arranged and connected to each other.

In the present disclosure, the housing and the bottom plate are separately arranged, so that, when the electronic element is replaced, only the corresponding bottom plate is required to be replaced, and there is no need to replace the housing, thereby reducing the manufacturing costs of the junction box.

In one or more embodiments, along the thickness direction of the junction box, the housing is provided with a first groove on one side adjacent to the bottom plate, and the bottom plate is mounted in the first groove.

In one or more embodiments, the bottom plate includes a body portion and a first extension, wherein along a length direction and/or a width direction of the junction box, the first extension extends away from the body portion, and along the thickness direction of the junction box, the first extension has a thickness less than the body portion, and the first extension is located one side of the body portion away from the housing. At least part of the first extension is located in the first groove, and at least part of the body portion is located in the accommodation space and abuts against a sidewall of the accommodation space.

In one or more embodiments, along the thickness direction of the junction box, the thickness of the first extension is less than or equal to a depth of the first groove.

In one or more embodiments, one of the housing and the bottom plate is provided with a mounting portion and the other is provided with a fitting portion, and at least part of the mounting portion is located in the fitting portion and abuts against a sidewall of the fitting portion. Along the thickness direction of the junction box, the first groove includes a first wall arranged opposite to the bottom plate, and the mounting portion or the fitting portion is provided on the first wall.

In one or more embodiments, the junction box includes an output wire, wherein one end of the output wire is located in the accommodation cavity and electrically connected to the electronic element, and the other end of the output wire extending along a length direction or width direction of the junction box and located outside the accommodation cavity. The electronic element includes an element body and a second extension, one end of the second extension is connected to the element body, and the other end of the second extension is electrically connected to the output wire.

In one or more embodiments, the electronic element further includes an output terminal located at one end of the second extension away from the element body, and the second extension and the output wire are electrically connected through the output terminal. Along the thickness direction of the junction box, an orthographic projection width of the output terminal is greater than an orthographic projection width of the second extension.

In one or more embodiments, the bottom plate includes a support, and along the thickness direction of the junction box, the support extends toward to the output terminal and abuts against the output terminal. The bottom plate further includes a first stopper, and along the thickness direction of the junction box, the first stopper abuts against one side of the output terminal away from the bottom plate.

In one or more embodiments, along the thickness direction of the junction box, the output wire is located on one side of the output terminal adjacent to the bottom plate. The support further includes a second groove, and part of the output wire is located in the second groove.

In one or more embodiments, the assembly module further includes a connector mounted on the bottom plate, and the electronic element and the output wire are electrically connected through the connector.

In a second aspect of the present disclosure, a method for mounting a junction box described in the first aspect is provided, the junction box further includes an output wire, and the method includes: manufacturing the housing and the bottom plate that fit each other in dimension; mounting the electronic element on the bottom plate to form the assembly module; connecting the bottom plate with the housing, so that at least part of the electronic element is located in the accommodation cavity; and electrically connecting one end of the output wire with the electronic element, and extending the other end of the output wire outside the accommodation cavity along a length direction or width direction of the junction box.

In one or more embodiments, one of the housing and the bottom plate is provided with a mounting portion and the other is provided with a fitting portion. The mounting the electronic element on the bottom plate includes: along a thickness direction of the junction box, extending at least part of the mounting portion into the fitting portion to abut against a sidewall of the fitting portion.

In a third aspect of the present disclosure, a photovoltaic module is provided, including a plurality of solar cells and the junction box as described in the first aspect. The junction box is connected to the solar cells and is configured to collect and transfer electrical energy from the solar cells to external devices.

It should be understood that the general description above and the detailed description in the following are merely exemplary and cannot limit the present disclosure.

Figure 1:
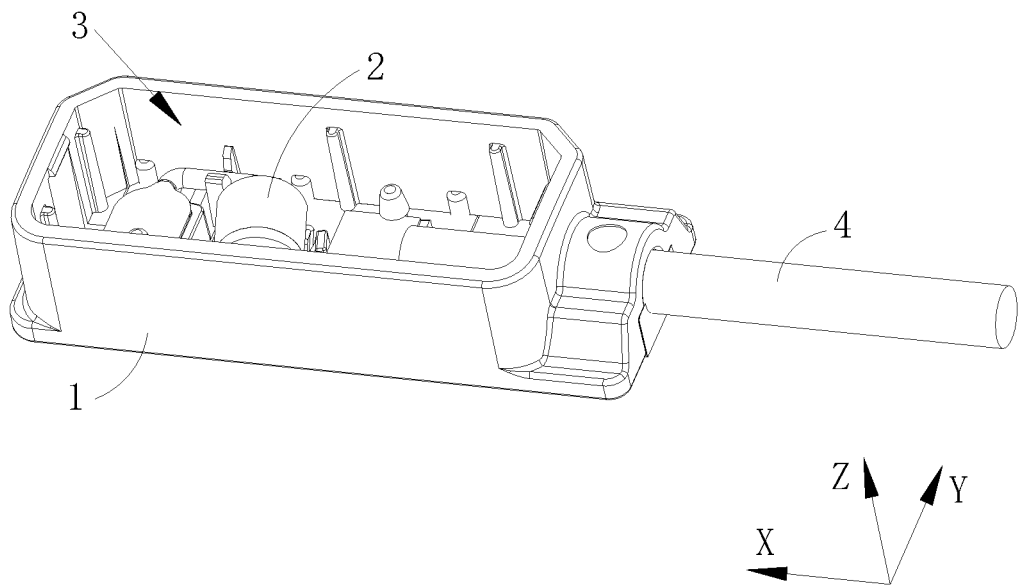
FIG. 1 is a schematic structural diagram of a junction box according to one or more embodiments of the present disclosure.
Figure 2:
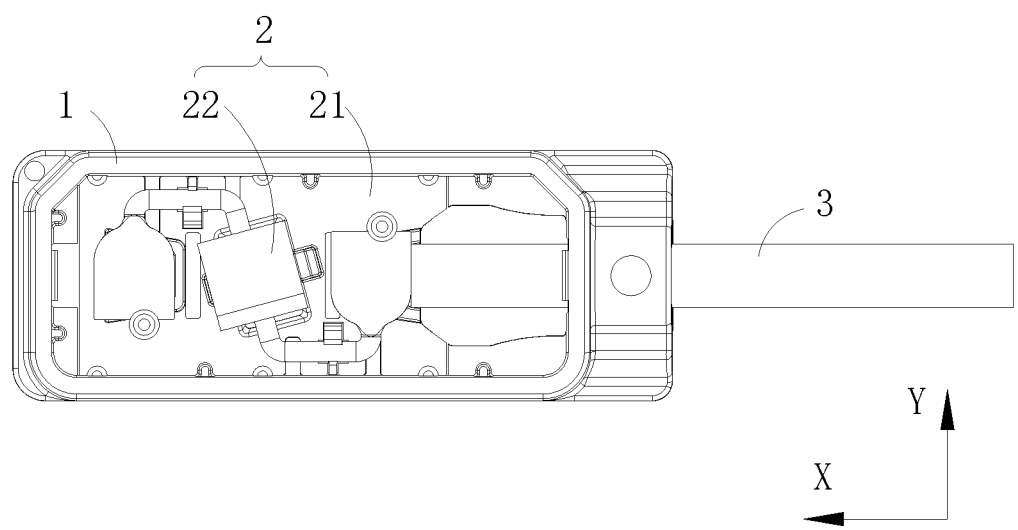
FIG. 2 is a top view of the junction box in FIG. 1 according to some embodiments of the present disclosure.

The accompanying drawings herein, which are incorporated in and constitute a part of this specification, illustrate embodiments consistent with the present disclosure and, together with the specification, serve to explain principles of the present disclosure.

DESCRIPTION OF EMBODIMENTS

In order to better understand the technical solution of the present disclosure, embodiments of the present disclosure are described in detail below with reference to the accompanying drawings.

It should be made clear that the embodiments described are only some rather than all of the embodiments of the present disclosure. All other embodiments acquired by those of ordinary skill in the art without creative efforts based on the embodiments in the present disclosure fall within the protection scope of the present disclosure.

The terms used in the embodiments of the present disclosure are intended to describe particular embodiments and are not intended to limit the present disclosure. As used in the specification of the present disclosure and the appended claims, the singular forms of "a/an", "the", and "said" are intended to include plural forms, unless otherwise clearly specified in the context.

It should be understood that the term "and/or" used herein only describes an association relationship between associated objects and represents that three relationships may exist. For example, A and/or B may represent the following three cases: only A exists, both A and B exist, and only B exists. In addition, the character "/" herein generally means that associated objects before and after it are in an "or" relationship.

It is to be noted that positional terms such as "above" or "below", "left", and "right" described in the embodiments of the present disclosure are described from the perspective shown in the drawings and should not be construed as limiting the embodiments of the present disclosure. In addition, in the context, it should be further understood that, when an element is referred to as "above" or "below" another element, it can be directly connected "above" or "below" another element, and can also be indirectly connected "above" or "below" another element through an intermediate element.

In a first aspect, some embodiments of the present disclosure provide a junction box. As shown in FIG. 1 to FIG. 5, the junction box includes a housing 1 and an assembly module 2. The housing 1 is hollow inside to form an accommodation space 11. The accommodation space 11 passes through two sides of the housing 1 along a thickness direction of the junction box. The assembly module 2 includes a bottom plate 21 and an electronic element 22. Along the thickness direction of the junction box, the bottom plate 21 is mounted on one side of the housing 1, the bottom plate 21 and the housing 1 define an accommodation cavity 3. The electronic element 22 is mounted on the bottom plate 21, and at least part of the electronic element 22 is located in the accommodation cavity 3, so as to reduce the risk of damages to the electronic element 22 due to interference of external environments and objects during mounting, transportation, and use, thereby improving stability of the electronic element 22 and prolonging the service life of the electronic element 22. The electronic element 22 may be a diode, a circuit board, or the like. In some embodiments of the present disclosure, the electronic element 22 is a diode. In addition, the junction box has a first direction X, a second direction Y, and a third direction Z perpendicular to each other. The first direction X may be a length direction of the junction box, the second direction Y may be a width direction of the junction box, and the third direction Z may be a thickness direction of the junction box.

Figure 4:
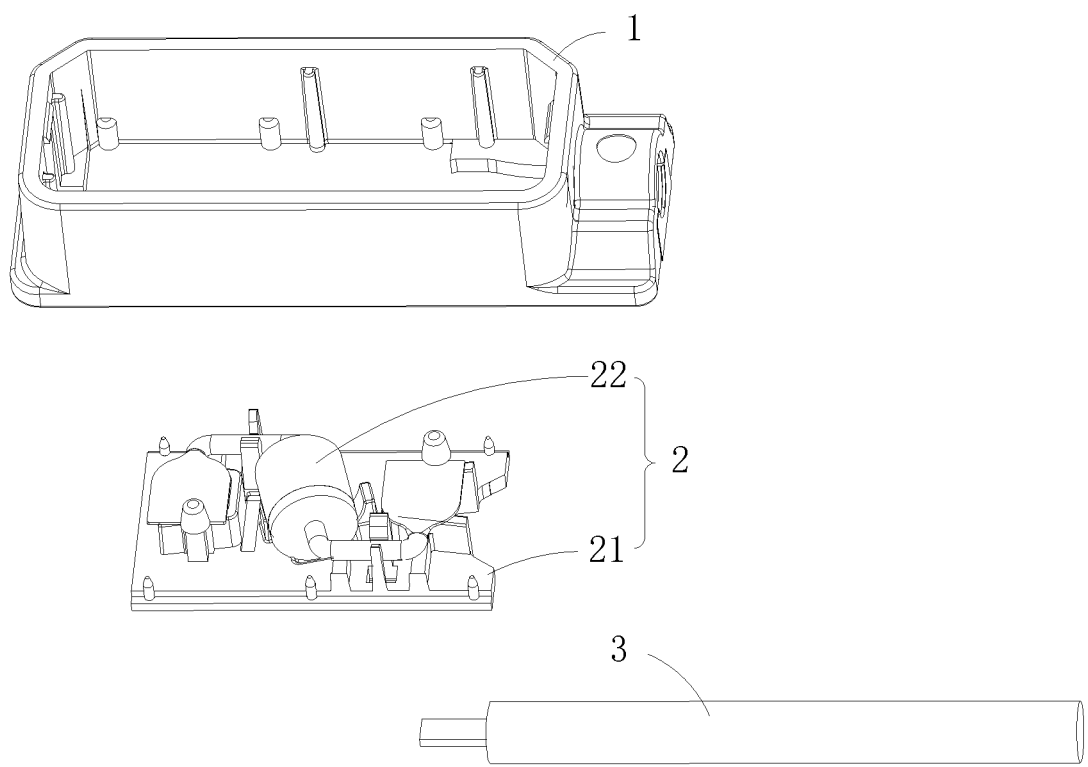
FIG. 4 is an exploded view of the junction box in FIG. 2.
Figure 5:
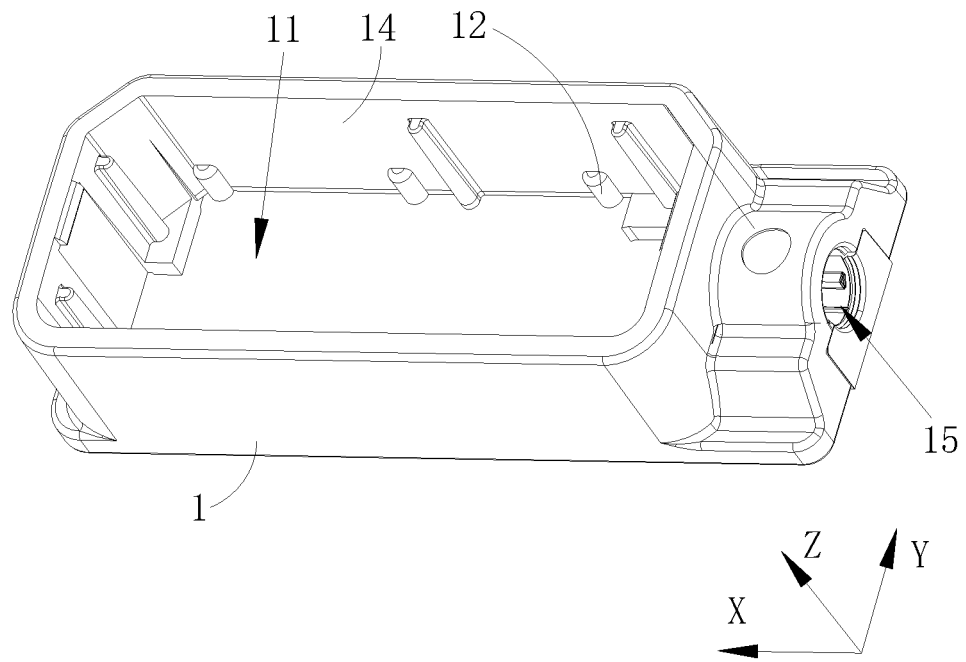
FIG. 5 is a schematic structural diagram of a housing in FIG. 1.

As shown in FIG. 4, the housing 1 and the bottom plate 21 are separately arranged and connected to each other.

When the structure, the dimension, or the type of the electronic element 22 mounted on the bottom plate 21 changes, the structure on the bottom plate 21 configured to fix the electronic element 22 may change accordingly. If the housing 1 and the bottom plate 21 are integrally formed, when the internal electronic element 22 is replaced, an overall structure of the housing 1 and the bottom plate 21 is required to be replaced. That is, corresponding to different electronic elements 22, different housings 1 and bottom plates 21 need to be manufactured, which increases the manufacturing costs of the junction box, and increases limitations of the structure, the dimension, and the type of the electronic element 22 that can be mounted inside the junction box. In one or more embodiments, the housing 1 and the bottom plate 21 are separately arranged, so that, when the electronic element 22 is replaced, only the corresponding bottom plate 21 is required to be replaced, thereby reducing the manufacturing costs of the junction box, which facilitates the replacement of the electronic element 22 to improve performance of the junction box.

Figure 6:
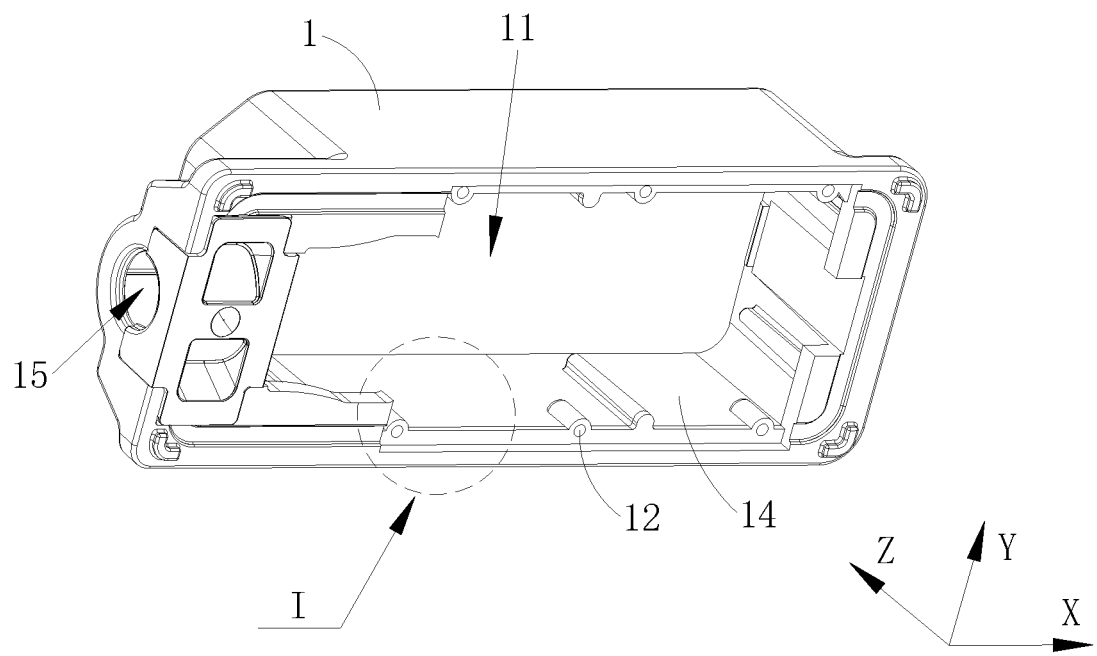
FIG. 6 is a schematic structural diagram of the housing in FIG. 5 from another perspective.
Figure 7:
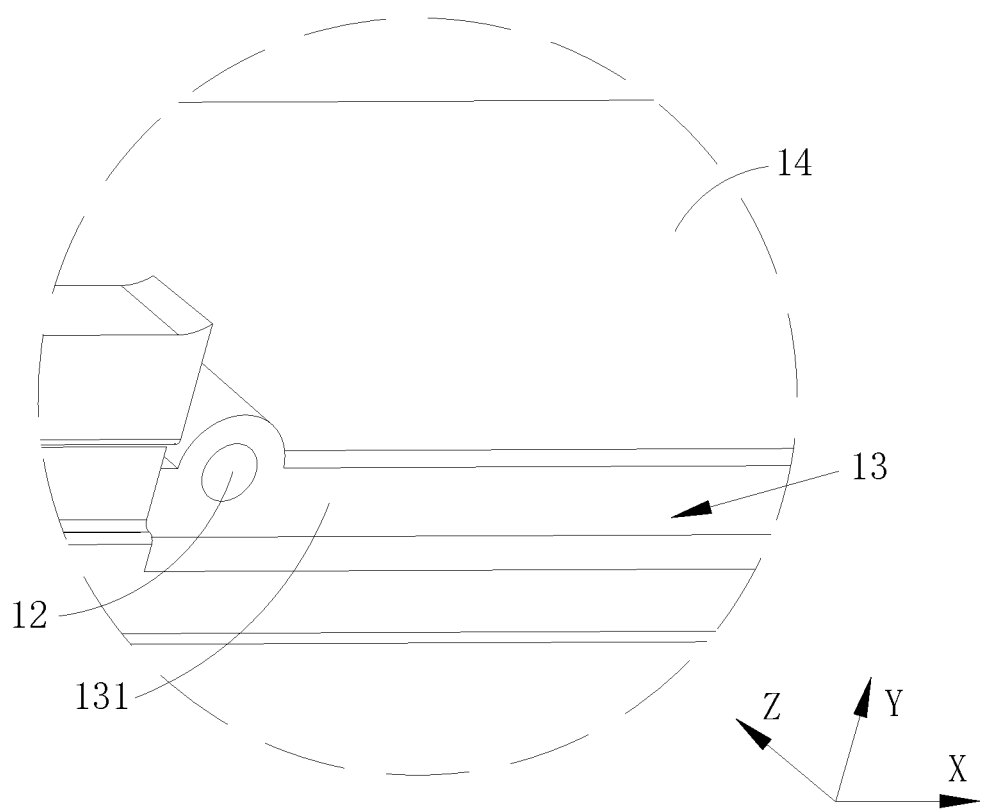
FIG. 7 is an enlarged view of Part I in FIG. 6.

As shown in FIG. 6 and FIG. 7, along the third direction Z, the housing 1 is provided with a first groove 13 on one side close to the bottom plate 21, and the bottom plate 21 is mounted in the first groove 13.

In one or more embodiments, the bottom plate 21 is mounted in the first groove 13, which reduces an overall thickness of the junction box after the bottom plate 21 is mounted on the housing 1, thereby helping to reduce an overall dimension of the junction box and reducing the mounting space required by the junction box, so as to facilitate carrying and mounting of the junction box.

Figure 8:
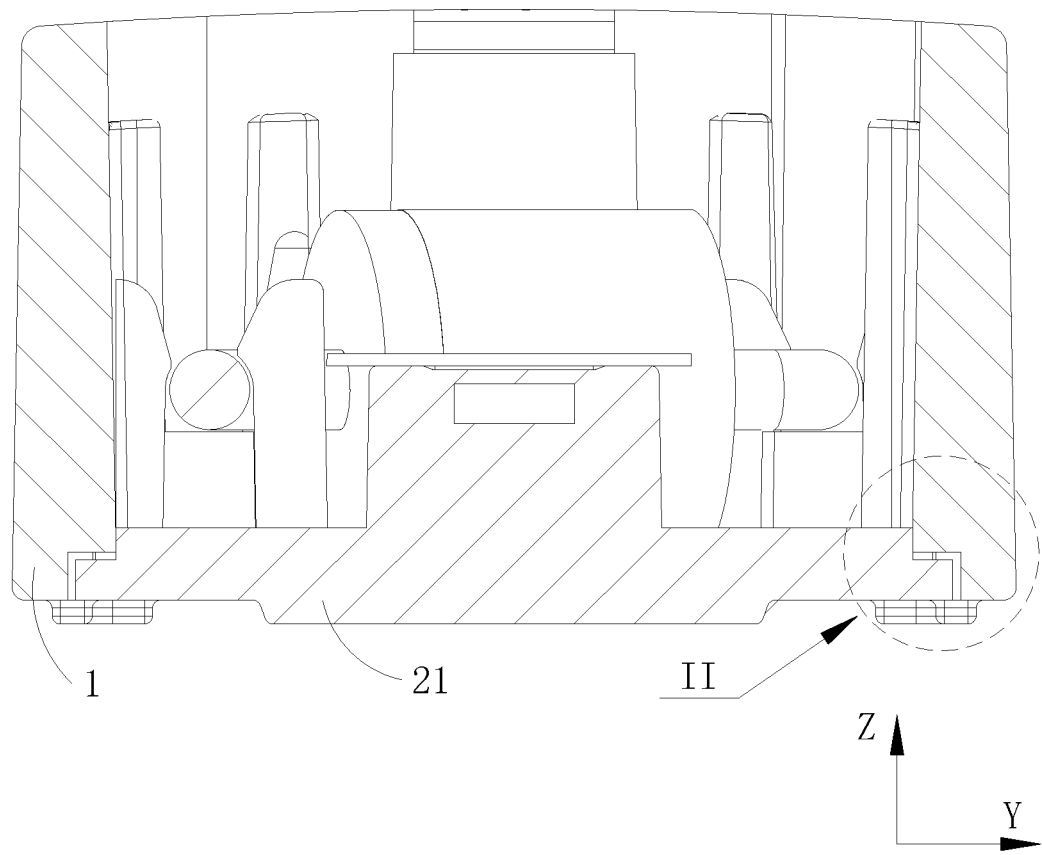
FIG. 8 is a sectional view of FIG. 1.
Figure 9:
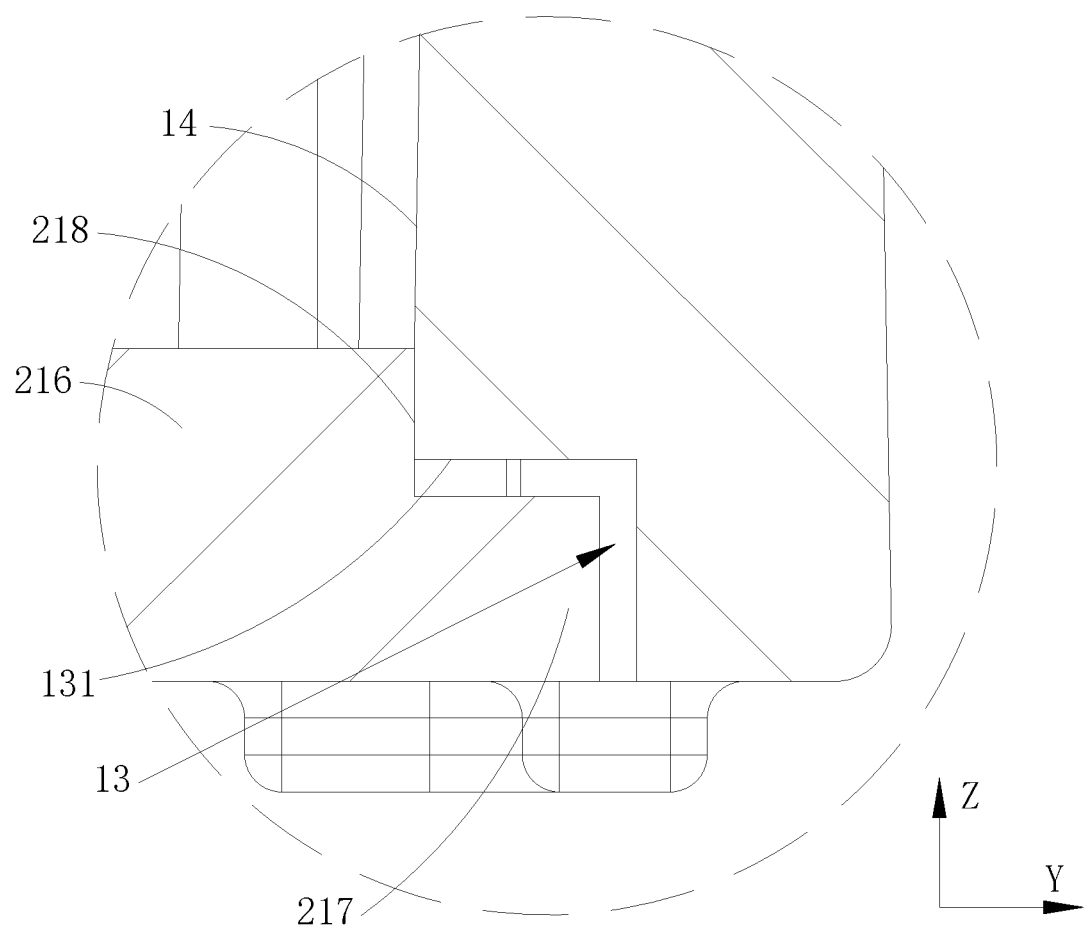
FIG. 9 is an enlarged view of Part II in FIG. 8.

As shown in FIG. 8 and FIG. 9, the bottom plate 21 includes a body portion 216 and a first extension 217. Along the first direction X and/or the second direction Y, the first extension 217 extends toward a direction away from the body portion 216. Along the third direction Z, a thickness of the first extension 217 is less than the body portion 216, and the first extension 217 is located one side of the body portion 216 away from the housing 1. At least part of the first extension 217 is located in the first groove 13, and at least part of the body portion 216 is located in the accommodation space 11 and abuts against the sidewall of the accommodation space 11.

In one or more embodiments, the body portion 216 is provided with a thinner first extension 217 on one side away from the housing 1. During the mounting process, the first extension 217 is mounted in the first groove 13 of the housing 1, and at least part of the body portion 216 extends into the accommodation space 11, which reduces the depth of the first groove 13 required to mount the bottom plate 21, thereby improving strength of the housing 1, reducing the risk of cracks of and damages to the housing 1 during the mounting, transportation, and use, and thus prolonging the service life of the housing 1.

As shown in FIG. 8 and FIG. 9, a part of the body portion 216 above the first extension 217 has a second wall 218 extending along the third direction Z. When the body portion 216 extends into the accommodation space 11, the second wall 218 can abut against a third wall 14 of the accommodation space 11 to limit movement of the bottom plate 21 along the first direction X and/or the second direction Y, which simplifies the mounting operation and improves accuracy of the mounting position of the bottom plate 21.

As shown in FIG. 8 and FIG. 9, along the third direction Z, the thickness of the first extension 217 is less than or equal to the depth of the first groove 13, which reduces the risk of protrusion of the first extension 217 from the housing 1 after the bottom plate 21 is mounted on the housing 1, thereby further reducing the overall thickness of the junction box.

In some embodiments, the bottom plate 21 and the housing 1 are connected to each other through a fastener. The fastener includes, but is not limited to, a screw, a bolt, a pin, and the like.

Figure 11:
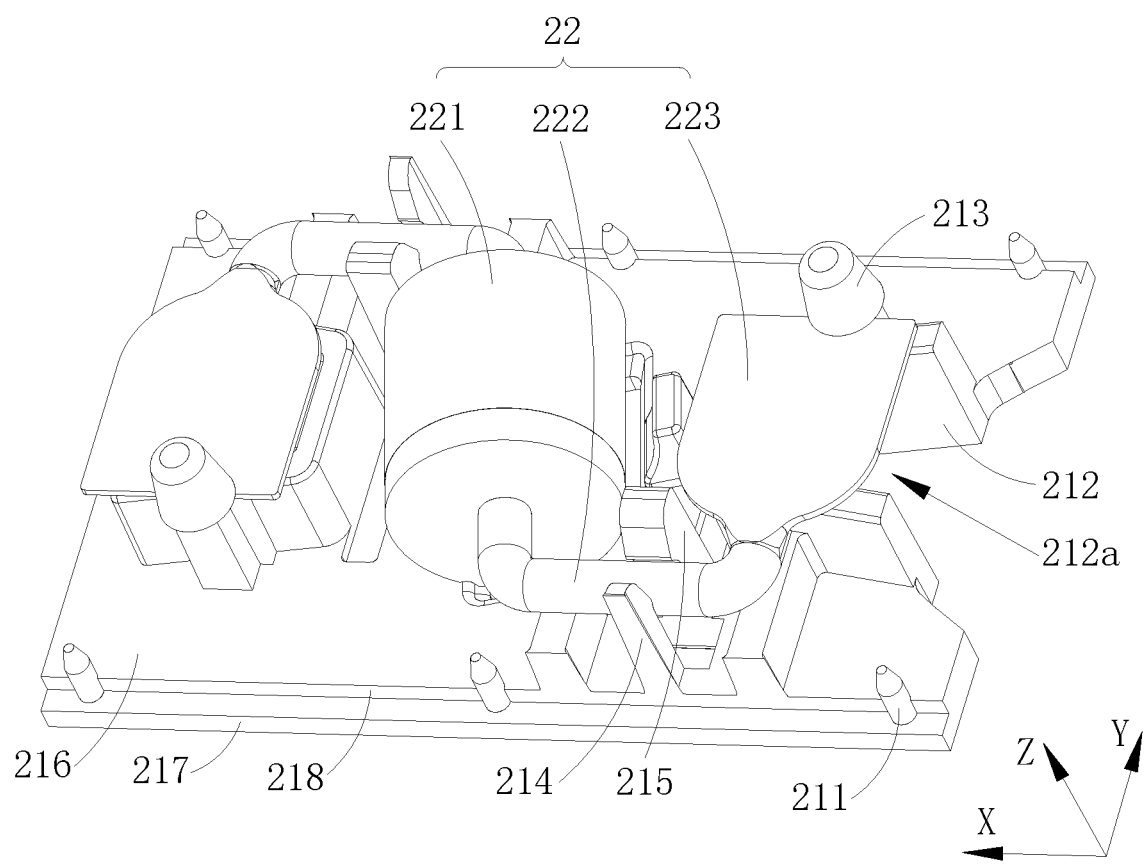
FIG. 11 is a schematic structural diagram of the assembly module in FIG. 2.

In some other embodiments, as shown in FIG. 6, FIG. 7, and FIG. 11, one of the housing 1 and the bottom plate 21 is provided with a mounting portion 211 and the other is provided with a fitting portion 12. At least part of the mounting portion 211 is located in the fitting portion 12 and abuts against the sidewall of the fitting portion 12. Along the third direction Z, the first groove 13 has a first wall 131 arranged opposite to the bottom plate 21, and the mounting portion 211 or the fitting portion 12 is arranged on the first wall 131. For the convenience of description, in the following, the mounting portion 211 is arranged on the bottom plate 21, and the fitting portion 12 is arranged on the housing 1.

In one or more embodiments, when the bottom plate 21 is mounted, the mounting portion 211 can extend into the fitting portion 12 and abut against the sidewall of the fitting portion 12, so that the mounting portion 211 is clamped and fixed by the sidewall of the fitting portion 12, so as to realize the connection between the bottom plate 21 and the housing 1. Through the mounting portion 211 and the fitting portion 12, the connection between the bottom plate 21 and the housing 1 is realized, which reduces the number of members required to mount the bottom plate 21 on the housing 1, and simplifies the mounting operation of the bottom plate 21, thereby shortening an overall mounting cycle of the junction box.

As shown in FIG. 6, the fitting portion 12 extends along the third direction Z, and the fitting portion 12 protrudes from the third wall 14, which reduces the thickness of the housing 1 and reduces machining costs of the housing 1 while ensuring strength of the fitting portion 12.

As shown in FIG. 6 and FIG. 11, along the first direction X and/or the second direction Y, a plurality of mounting portions 211 and a plurality of fitting portions 12 are provided, so as to improve stability of the connection between the bottom plate 21 and the housing 1.

Figure 10:
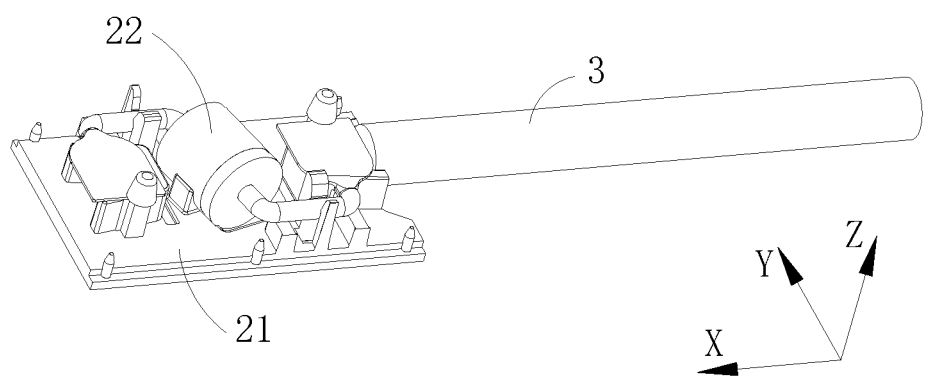
FIG. 10 is a schematic structural diagram of an assembly module in FIG. 2 connected to an output wire.

As shown in FIG. 1 to FIG. 4, the junction box includes an output wire 4, one end of the output wire 4 is located in the accommodation cavity 3 and electrically connected to the electronic element 22, and the other end of the output wire 4 extends outside the accommodation cavity 3 along the first direction X or the second direction Y. As shown in FIG. 10 and FIG. 11, the electronic element 22 includes an element body 221 and a second extension 222, one end of the second extension 222 is connected to the element body 221, and the other end of the second extension 222 is electrically connected to the output wire 4.

In one or more embodiments, the electronic element 22 inside the junction box is electrically connected to an external element through the output wire 4, which simplifies the electrical connection between the junction box and the external element and improves stability of signal transmission, thereby improving the performance of the junction box.

In some embodiments, as shown in FIG. 11, the electronic element 22 further includes an output terminal 223, the output terminal 223 is located at one end of the second extension 222 away from the element body 221, and the second extension 222 and the output wire 4 are electrically connected through the output terminal 223. Along the third direction Z, a projection width of the output terminal 223 is greater than the second extension 222.

In one or more embodiments, the electronic element 22 and the output wire 4 are connected through the output terminal 223 having a larger area, which increases the connection area between the electronic element 22 and the output wire 4 and reduces the risk of separation of the electronic element 22 from the output wire 4 due to external force on the connection position during the mounting, transportation, and use, thereby improving stability of the connection between the electronic element 22 and the output wire 4 and then improving stability of the connection between the junction box and the external element and the performance of the junction box.

As shown in FIG. 11, the bottom plate 21 is provided with a support 212, and along the third direction Z, the support 212 extends toward a direction close to the output terminal 223 and abuts against the output terminal 223. The bottom plate 21 is further provided with a first stopper 213, and along the third direction Z, the first stopper 213 abuts against one side of the output terminal 223 away from the bottom plate 21.

In one or more embodiments, when the electronic element 22 is mounted on the bottom plate 21, along the third direction Z, two sides of the output terminal 223 abut against the support 212 and the first stopper 213, respectively. That is, the output terminal 223 is clamped and fixed by the support 212 and the first stopper 213, which reduces the risk of damages to the output terminal 223 due to inclination and detachment from the support 212 under the action of external force during the mounting, transportation, and use, thereby improving stability of the connection between the output terminal 223 and the support 212, prolonging the service life of the electronic element 22, and improving stability of the electronic element 22.

As shown in FIG. 11, along the third direction Z, the output wire 4 is located on one side of the output terminal 223 close to the bottom plate 21. The support 212 is provided with a second groove 212a, and part of the output wire 4 is located in the second groove 212a.

In one or more embodiments, along the third direction Z, the output terminal 223 is fixed above the support 212 and blocks at least part of the second groove 212a, and one end of the output wire 4 extends into the second groove 212a and is connected to the output terminal 223. In this case, along the third direction Z, the support 212 and the output wire 4 are located on a same side of the electronic element 22. The arrangement of the second groove 212a reduces the risk of separation of the output wire 4 from the output terminal 223 under the action of the support 212 caused by interference of the output wire 4 with the support 212, thereby improving stability of the connection between the output wire 4 and the output terminal 223. At the same time, the output wire 4 extends into the second groove 212a and is connected to the output terminal 223, which reduces the accommodation space 11 occupied by an entirety of the output wire 4 and the assembly module 2 after connection, thereby helping to reduce an overall dimension of the junction box, improve integration of the junction box while reducing manufacturing costs of the junction box, and improve performance of the junction box.

In some embodiments, as shown in FIG. 11, the bottom plate 21 is further provided with a second stopper 214 and a third stopper 215 arranged opposite to each other along a radial direction of the second extension 222, and the second stopper 214 and the third stopper 215 abut against the second extension 222 to limit movement of the second extension 222 along the first direction X, the second direction Y, and the third direction Z, thereby improving stability of the connection between the electronic element 22 and the bottom plate 21, which, at the same time, reduces the risk of damages to the second extension 222 due to yaw movement under the action of external force during the mounting, transportation, and use, thereby improving stability of the electronic element 22 and prolonging the service life of the electronic element 22.

Figure 3:
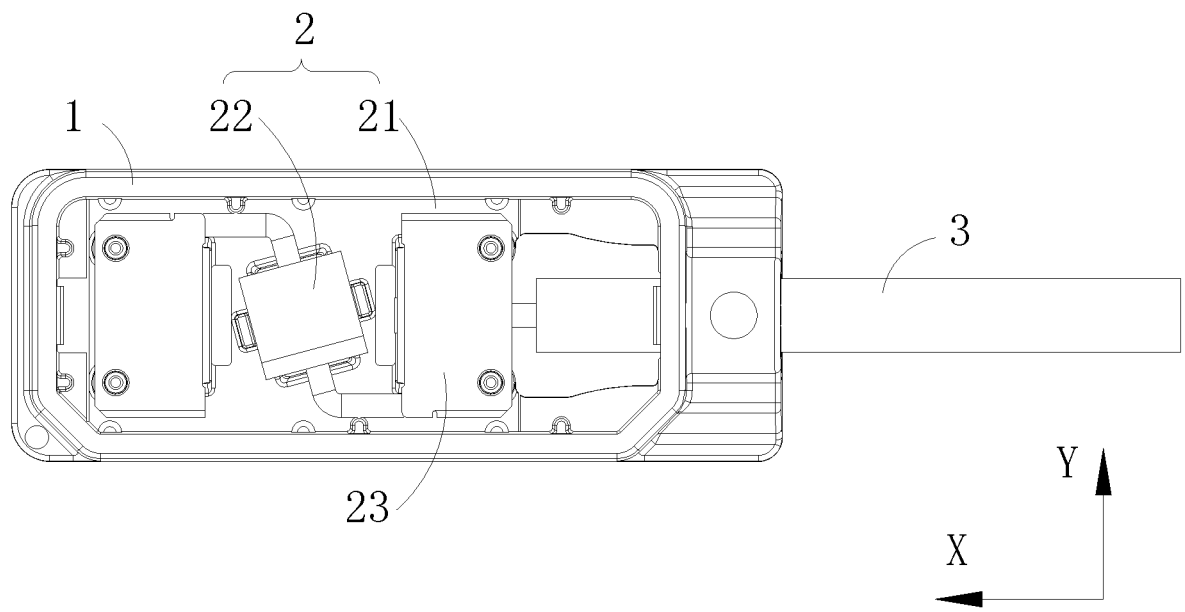
FIG. 3 is a top view of the junction box in FIG. 1 according to some other embodiments of the present disclosure.
Figure 12:
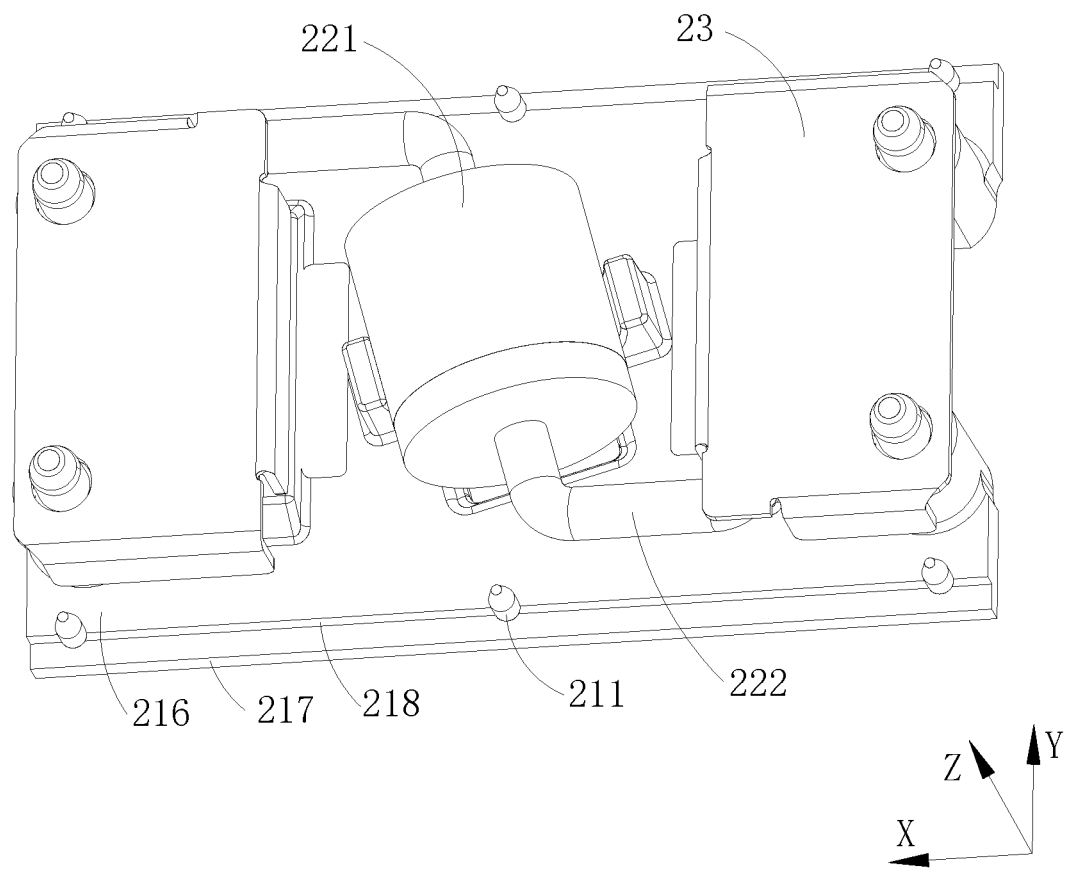
FIG. 12 is a schematic structural diagram of the assembly module in FIG. 3.

In some other embodiments, as shown in FIG. 3 and FIG. 12, the assembly module 2 further includes a connector 23, the connector 23 is mounted on the bottom plate 21, and the electronic element 22 and the output wire 4 are electrically connected through the connector 23.

In one or more embodiments, the electronic element 22 and the output wire 4 are electrically connected through the connector 23, which simplifies the connection between the electronic element 22 and the output wire 4 and reduces the risk of a smaller dimension of a connection portion between the electronic element 22 and the output wire 4, thereby improving stability of the connection between the electronic element 22 and the output wire 4.

Figure 13:
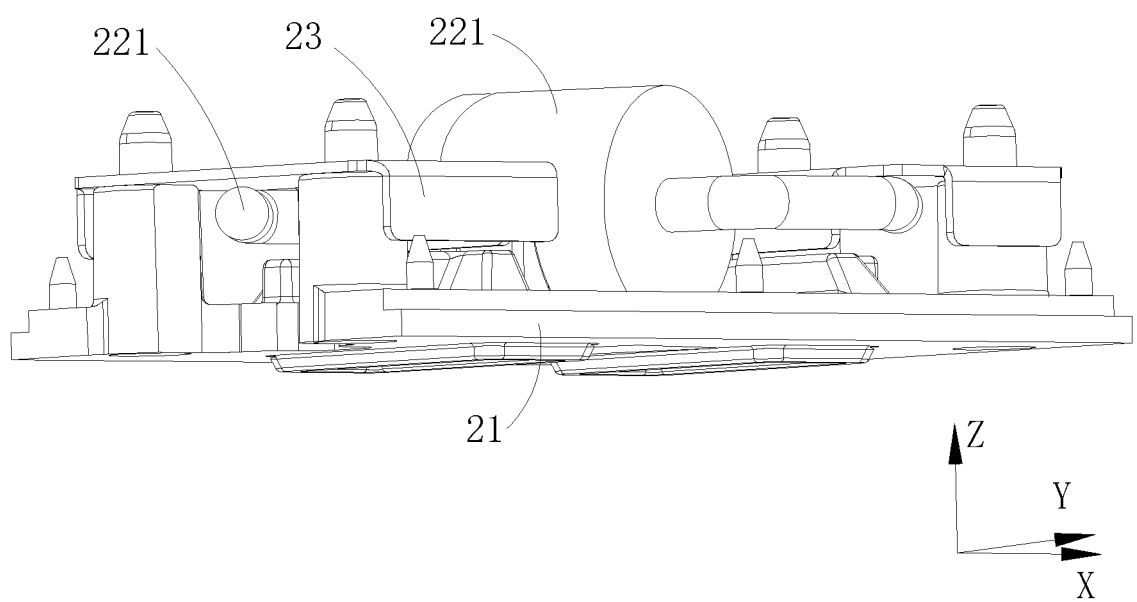
FIG. 13 is a schematic structural diagram of the assembly module in FIG. 12 from another perspective.

As shown in FIG. 13, after the electronic element 22 is mounted on the bottom plate 21, along the third direction Z, the connector 23 covers the second extension 222 of the electronic element 22, so that the second extension 222 abuts against the connector 23. One end of the output wire 4 extends into a cavity defined by the connector 23 and the bottom plate 21, so that the output wire 4 abuts against the connector 23. Along the third direction Z, the output wire 4 and the second extension 222 are located on a same side of the connector 23 to reduce the accommodation space 11 occupied by the entirety of the output wire 4 and the assembly module 2 after connection, thereby helping to reduce the overall dimension of the junction box, which improves the integration of the junction box while reducing the manufacturing costs of the junction box, and improves the performance of the junction box.

The connector 23 is made of a conductive material. The specific material of the connector 23 is not specially limited in the present disclosure.

In addition, the connector 23 and the bottom plate 21 are connected by, but not limited to, bonding, clamping, soldering, or fixed through a fastener. The fastener includes, but is not limited to, a screw, a bolt, a pin, and the like.

Based on the junction box in any one of the above embodiments, in a second aspect, some embodiments of the present disclosure provide a method for mounting a junction box, including: manufacturing the housing 1 and the bottom plate 21 that fit each other; mounting the electronic element 22 on the bottom plate 21 to form the assembly module 2; connecting the bottom plate 21 with the housing 1, so that at least part of the electronic element 22 is located in the accommodation cavity 3; and electrically connecting one end of the output wire 4 with the electronic element 22, and extending the other end of the output wire 4 outside the accommodation cavity 3 along the first direction X or the second direction Y for connection with an external element.

In one or more embodiments, the housing 1 and the bottom plate 21 are separately arranged, so that, when the electronic element 22 is replaced, the bottom plate 21 can be replaced accordingly. There is no need to replace the housing 1, so as to reduce the machining costs of the junction box.

For example, the step of mounting the electronic element 22 on the bottom plate 21 includes: along the third direction Z, extending at least part of the mounting portion 211 into the fitting portion 12, so that the mounting portion 211 abuts against a sidewall of the fitting portion 12.

Based on the above, specific mounting steps for the junction box according to some embodiments of the present disclosure are as follows: manufacturing the housing 1; manufacturing the bottom plate 21 matching housing 1 and the electronic element 22; mounting the electronic element 22 on the bottom plate 21; along the third direction Z, placing the first extension 217 of the bottom plate 21 in the first groove 13 of the housing 1, the body portion 216 extends into the accommodation space 11 to abut against the third wall 14 of the accommodation space 11, and the mounting portion 211 extends into the fitting portion 12 and abuts against a sidewall of the fitting portion 12; extending one end of the output wire 4 into the accommodation space 11 via an output hole 15 in the housing 1, for electrical connection with the electronic element 22; and electrically connecting one end of the output wire 4 outside the accommodation space 11 with an external element.

In one or more embodiments, a photovoltaic module is provided, which includes a plurality of solar cells and the junction box as described above. The junction box is connected to the solar cells and is configured to collect and transfer electrical energy from the solar cells to external devices.

In the present disclosure, the housing 1 and the bottom plate 21 are separately arranged, so that, when the electronic element 22 is replaced, only the corresponding bottom plate 21 is required to be replaced, and there is no need to replace the housing 1, thereby reducing the manufacturing costs of the junction box, which facilitates the replacement of the electronic element 22 to improve performance of the junction box.

The above are merely preferred embodiments of the present disclosure and are not intended to limit the present disclosure. For those skilled in the art, the present disclosure may be subject to various changes and variations. Any modification, equivalent replacement, improvement, and the like made within the spirit and principles of the present disclosure shall fall within the protection scope of the present disclosure.

What is claimed is:

1. A junction box, comprising:
    a housing hollow inside to form an accommodation space, wherein the accommodation space passes through two sides of the housing along a thickness direction of the junction box; and
    an assembly module including a bottom plate and an electronic element, wherein along the thickness direction of the junction box, the bottom plate is mounted on one side of the housing, the bottom plate and the housing define an accommodation cavity, the electronic element is mounted on the bottom plate, and at least part of the electronic element is located in the accommodation cavity;
    wherein the housing and the bottom plate are separately arranged and connected to each other; and
    along the thickness direction of the junction box, a first groove is provided on a surface of the housing on one side adjacent to the bottom plate, and the bottom plate is mounted in the first groove.

2. The junction box according to claim 1, wherein the bottom plate includes a body portion and a first extension, wherein along a length direction and/or a width direction of the junction box, the first extension extends away from the body portion, and along the thickness direction of the junction box, the first extension has a thickness less than the body portion, and the first extension is located one side of the body portion away from the housing; and
    at least part of the first extension is located in the first groove, and at least part of the body portion is located in the accommodation space and abuts against a sidewall of the accommodation space.

3. The junction box according to claim 2, wherein along the thickness direction of the junction box, the thickness of the first extension is less than or equal to a depth of the first groove.

4. The junction box according to claim 1, wherein, one of the housing and the bottom plate is provided with a mounting portion and the other is provided with a fitting portion, and at least part of the mounting portion is located in the fitting portion and abuts against a sidewall of the fitting portion; and
    along the thickness direction of the junction box, the first groove includes a first wall arranged opposite to the bottom plate, and the mounting portion or the fitting portion is provided on the first wall.

5. The junction box according to claim 1, further comprising an output wire, wherein one end of the output wire is located in the accommodation cavity and electrically connected to the electronic element, and the other end of the output wire extending along a length direction or width direction of the junction box and located outside the accommodation cavity; and
    the electronic element includes an element body and a second extension, one end of the second extension is connected to the element body, and the other end of the second extension is electrically connected to the output wire.

6. The junction box according to claim 5, wherein the electronic element further includes an output terminal located at one end of the second extension away from the element body, and the second extension and the output wire are electrically connected through the output terminal; and
    along the thickness direction of the junction box, an orthographic projection width of the output terminal is greater than an orthographic projection width of the second extension.

7. The junction box according to claim 6, wherein the bottom plate includes a support, and along the thickness direction of the junction box, the support extends toward to the output terminal and abuts against the output terminal; and
    the bottom plate further includes a first stopper, and along the thickness direction of the junction box, the first stopper abuts against one side of the output terminal away from the bottom plate.

8. The junction box according to claim 7, wherein along the thickness direction of the junction box, the output wire is located on one side of the output terminal adjacent to the bottom plate; and
    the support further includes a second groove, and part of the output wire is located in the second groove.

9. The junction box according to claim 8, wherein the bottom plate further includes a second stopper and a third stopper arranged opposite to each other along a radial direction of the second extension, and the second stopper and the third stopper abut against the second extension to limit movement of the second extension along the thickness direction, the length direction and the width direction.

10. The junction box according to claim 5, wherein the assembly module further includes a connector mounted on the bottom plate, and the electronic element and the output wire are electrically connected through the connector.

11. The junction box according to claim 10, wherein the connector is connected to the bottom plate by bonding, clamping, soldering, or fixed through a fastener, and the fastener includes at least one of a screw, a bolt, or a pin.

12. The junction box according to claim 6, wherein the assembly module further includes a connector mounted on the bottom plate, and the electronic element and the output wire are electrically connected through the connector.

13. The junction box according to claim 7, wherein the assembly module further includes a connector mounted on the bottom plate, and the electronic element and the output wire are electrically connected through the connector.

14. The junction box according to claim 8, wherein the assembly module further includes a connector mounted on the bottom plate, and the electronic element and the output wire are electrically connected through the connector.

15. The junction box according to claim 9, wherein the assembly module further includes a connector mounted on the bottom plate, and the electronic element and the output wire are electrically connected through the connector.

16. A method for mounting a junction box, wherein the junction box comprises:
- a housing hollow inside to form an accommodation space, wherein the accommodation space passes through two sides of the housing along a thickness direction of the junction box;
- an assembly module including a bottom plate and an electronic element, wherein along the thickness direction of the junction box, the bottom plate is mounted on one side of the housing, the bottom plate and the housing define an accommodation cavity, the electronic element is mounted on the bottom plate, and at least part of the electronic element is located in the accommodation cavity; and
- an output wire,
- wherein the housing and the bottom plate are separately arranged and connected to each other, and along the thickness direction of the junction box, a first groove is provided on a surface of the housing on one side adjacent to the bottom plate;
- wherein the method comprises:
- manufacturing the housing and the bottom plate that fit each other in dimension;
- mounting the electronic element on the bottom plate to form the assembly module;
- mounting the bottom plate in the first groove, so that at least part of the electronic element is located in the accommodation cavity; and
- electrically connecting one end of the output wire with the electronic element, and extending the other end of the output wire outside the accommodation cavity along a length direction or width direction of the junction box.

17. The method for mounting a junction box according to claim 16, wherein one of the housing and the bottom plate is provided with a mounting portion and the other is provided with a fitting portion; and
- the mounting the electronic element on the bottom plate comprises:
- along a thickness direction of the junction box, extending at least part of the mounting portion into the fitting portion to abut against a sidewall of the fitting portion.

18. The method for mounting a junction box according to claim 16, wherein the bottom plate includes a body portion and a first extension, wherein along a length direction and/or a width direction of the junction box, the first extension extends away from the body portion, and along the thickness direction of the junction box, the first extension has a thickness less than the body portion, and the first extension is located one side of the body portion away from the housing; and
at least part of the first extension is located in the first groove, and at least part of the body portion is located in the accommodation space and abuts against a sidewall of the accommodation space,
subsequent to the mounting the electronic element on the bottom plate, the method further comprises:
placing along the thickness direction the first extension of the bottom plate into the first groove of the housing, and extending the body portion into the accommodation space to abut against a third wall of the accommodation space, and extending the mounting portion into the fitting portion to abut against a side wall of the fitting portion,
the method further comprises:
extending one end of the output wire into the accommodation space via an output hole in the housing for electrical connection with the electronic element; and
electrically connecting one end of the output wire outside the accommodation space with an external element.

19. A photovoltaic module, comprising:
a plurality of solar cells; and
at least one junction box connected to the plurality of solar cells and configured to collect and transfer electrical energy from the solar cells to external devices,
wherein the at least one junction box includes:
a housing hollow inside to form an accommodation space, wherein the accommodation space passes through two sides of the housing along a thickness direction of the junction box; and
an assembly module including a bottom plate and an electronic element, wherein along the thickness direction of the junction box, the bottom plate is mounted on one side of the housing, the bottom plate and the housing define an accommodation cavity, the electronic element is mounted on the bottom plate, and at least part of the electronic element is located in the accommodation cavity;
wherein the housing and the bottom plate are separately arranged and connected to each other; and
along the thickness direction of the junction box, a first groove is provided on a surface of the housing on one side adjacent to the bottom plate, and the bottom plate is mounted in the first groove.

* * * * *